US006552897B1

(12) United States Patent
Jetter et al.

(10) Patent No.: US 6,552,897 B1
(45) Date of Patent: Apr. 22, 2003

(54) DRIVE RETENTION MECHANISM

(75) Inventors: Robert S. Jetter, Fremont, CA (US); Tim O. Lau, Fremont, CA (US)

(73) Assignee: Acorn Product Development, Inc., Fremont, CA (US)

( * ) Notice: Subject to any disclaimer, the term of this patent is extended or adjusted under 35 U.S.C. 154(b) by 38 days.

(21) Appl. No.: 09/861,800

(22) Filed: May 21, 2001

(51) Int. Cl.[7] .................................................. G06F 1/16
(52) U.S. Cl. .................. 361/685; 312/223.1; 312/223.2
(58) Field of Search .............................. 361/685, 808, 361/825; 248/221.11, 560, 674; 312/223.2, 223.1

(56) References Cited

U.S. PATENT DOCUMENTS

| | | | | |
|---|---|---|---|---|
| 5,123,721 A | * | 6/1992 | Seo | 312/333 |
| 5,262,923 A | * | 11/1993 | Batta et al. | 312/333 |
| 5,564,804 A | * | 10/1996 | Gonzalez et al. | 312/223.2 |
| 6,299,266 B1 | * | 10/2001 | Justice et al. | 292/87 |
| 6,304,457 B1 | * | 10/2001 | Liu et al. | 174/51 |
| 6,330,147 B1 | * | 12/2001 | Adams et al. | 361/679 |
| 6,377,447 B1 | * | 4/2002 | Boe | 312/223.1 |
| 6,396,686 B1 | * | 5/2002 | Liu et al. | 248/27.3 |

* cited by examiner

Primary Examiner—Gerald Tolin
(74) Attorney, Agent, or Firm—The Kline Law Firm

(57) ABSTRACT

A spring loaded drive clip that retains a drive unit, typically a CD drive, in a component tray that is utilized in a rack mounting arrangement for a computer system is disclosed. The clip is mounted onto the chassis of the component tray, and includes a defined internal receiving area that receives the drive. The clip is mounted in the drive compartment so that arms of the clip support the drive as it is inserted into the compartment. As the drive unit is inserted, the arms of the clip are displaced outward by the drive as the drive moves into the compartment, thereby creating a spring force. One of the arms of the clip includes an inward extending securing projection. As the drive is inserted into the compartment, the drive must overcome an inward bias of the arms created by displacement of the spring blade in each of the arms. Therefore, as the drive is seated in the compartment, the securing projection is urged inward toward the drive. As the drive reaches its proper position in the compartment of the component tray, the securing projection slides into a standard tapped mounting hole in the drive case, thereby securing the drive in place.

3 Claims, 4 Drawing Sheets

DRIVE RETENTION MECHANISM

BACKGROUND OF THE INVENTION

1. Field of the Invention

The present invention relates generally to computer drive component mounting mechanisms, and more particularly is a spring loaded clip that retains a drive unit, typically a CD drive, in a component tray that is utilized in a rack system. This arrangement is generally found in server systems.

2. Description of the Prior Art

As computer systems grow increasingly larger and more complex, more and more businesses utilize a rack system that mounts a plurality of component trays vertically so as to conserve valuable floor space. Computer suppliers must mount the drives in the trays according to the end user's specifications.

The mounting operation has been historically a time consuming and labor intensive process. An operator must install the selected drive in the drive sled, and then install the drive sled in the tray. Typically, both steps of this operation are accomplished by the operator using a plurality of screws. While this type of assembly operation is fairly straightforward, it does give rise to significant time consumption.

Accordingly, it is an object of the present invention to provide a means of mounting a drive in a component tray that is quicker and easier than having to screw the component in place.

SUMMARY OF THE INVENTION

The present invention is a spring loaded drive clip that retains a drive unit, typically a CD drive, in a component tray that is utilized in a rack mounting arrangement for a computer system. The clip is mounted onto the chassis of the component tray, and includes a defined internal receiving area that receives the drive. The clip is mounted in the drive compartment so that arms of the clip support the drive as it is inserted into the compartment. As the drive unit is inserted, the arms of the clip are displaced outward by the drive as the drive moves into the compartment, thereby creating a spring force.

One of the arms of the clip includes an inward extending securing projection. As the drive is inserted into the compartment, the drive must overcome an inward bias of the arms created by the displacement of the spring blade in each of the arms. Therefore, as the drive is seated in the compartment, the securing projection is urged inward toward the drive. As the drive reaches its proper position in the compartment of the component tray, the securing projection slides into a standard tapped mounting hole in the drive case, thereby securing the drive in place.

An advantage of the present invention is that operator time to install the drive in the component tray is significantly reduced.

Another advantage of the present invention is that repeatability of the installation operation is improved, the possibility of operator error being reduced to an insignificant level.

These and other objects and advantages of the present invention will become apparent to those skilled in the art in view of the description of the best presently known mode of carrying out the invention as described herein and as illustrated in the drawings.

DETAILED DESCRIPTION OF THE INVENTION

Figure 1:
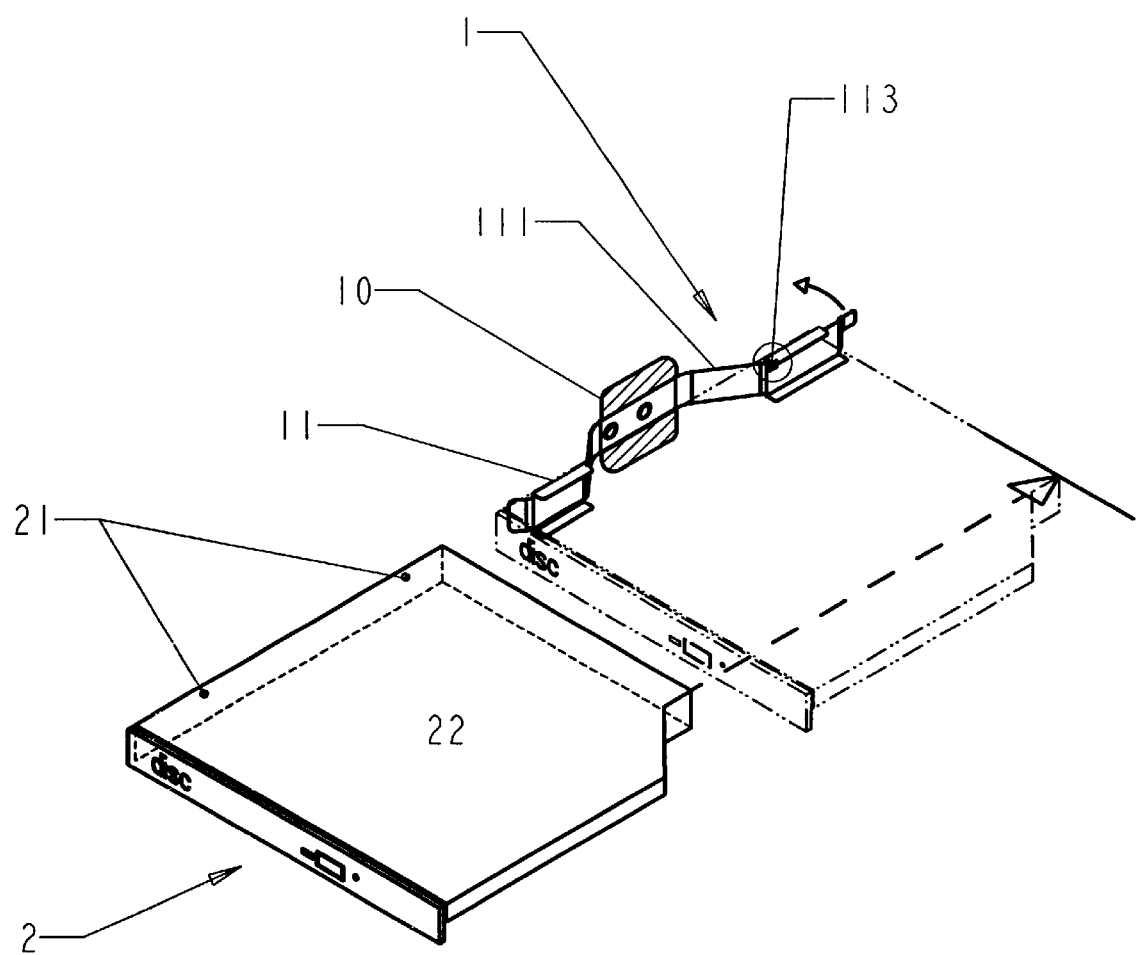
FIG. 1 is a perspective view of a drive as it is about to be inserted into the component tray. The drive is shown in phantom in the secured position.
Figure 2:
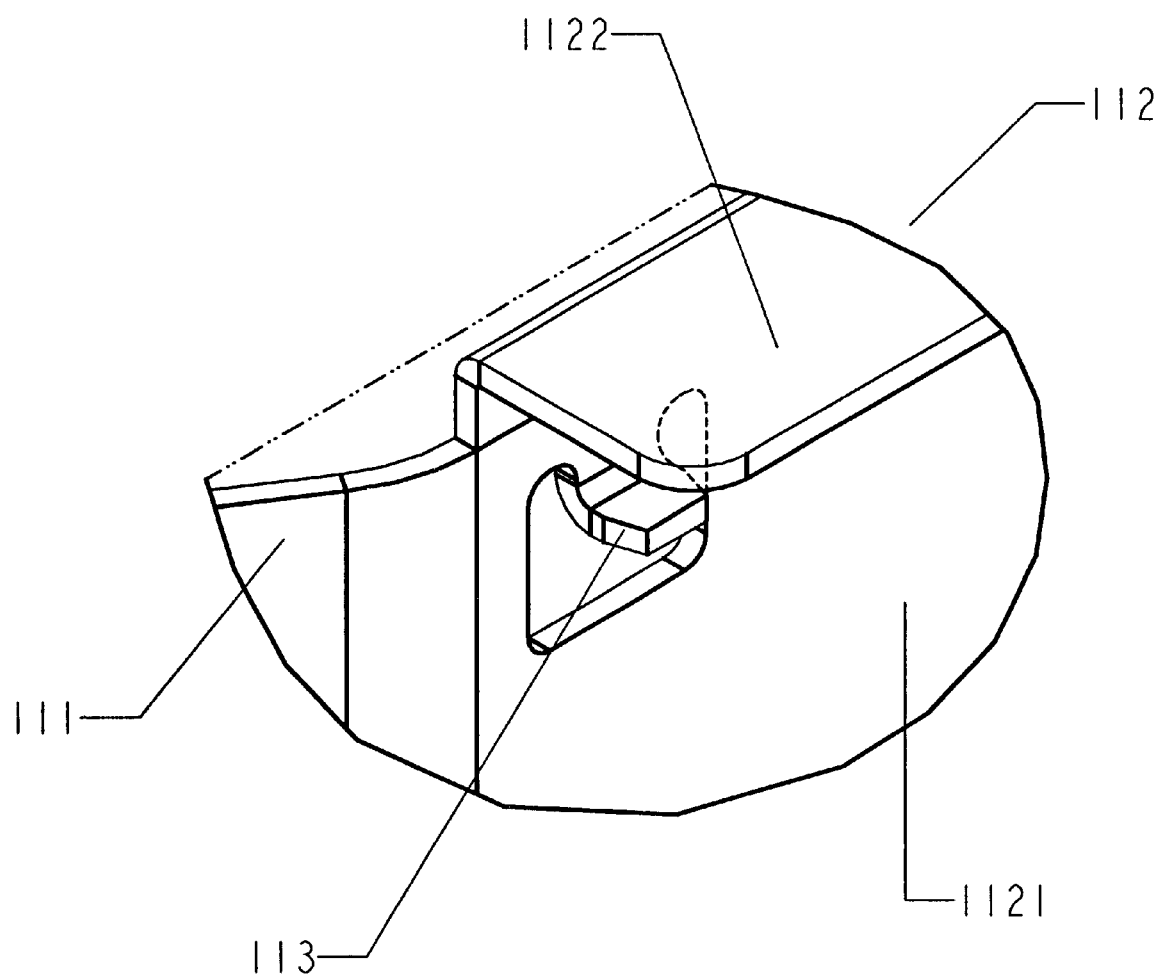
FIG. 2 is a detail view of the area circled in FIG. 1.
Figure 3:
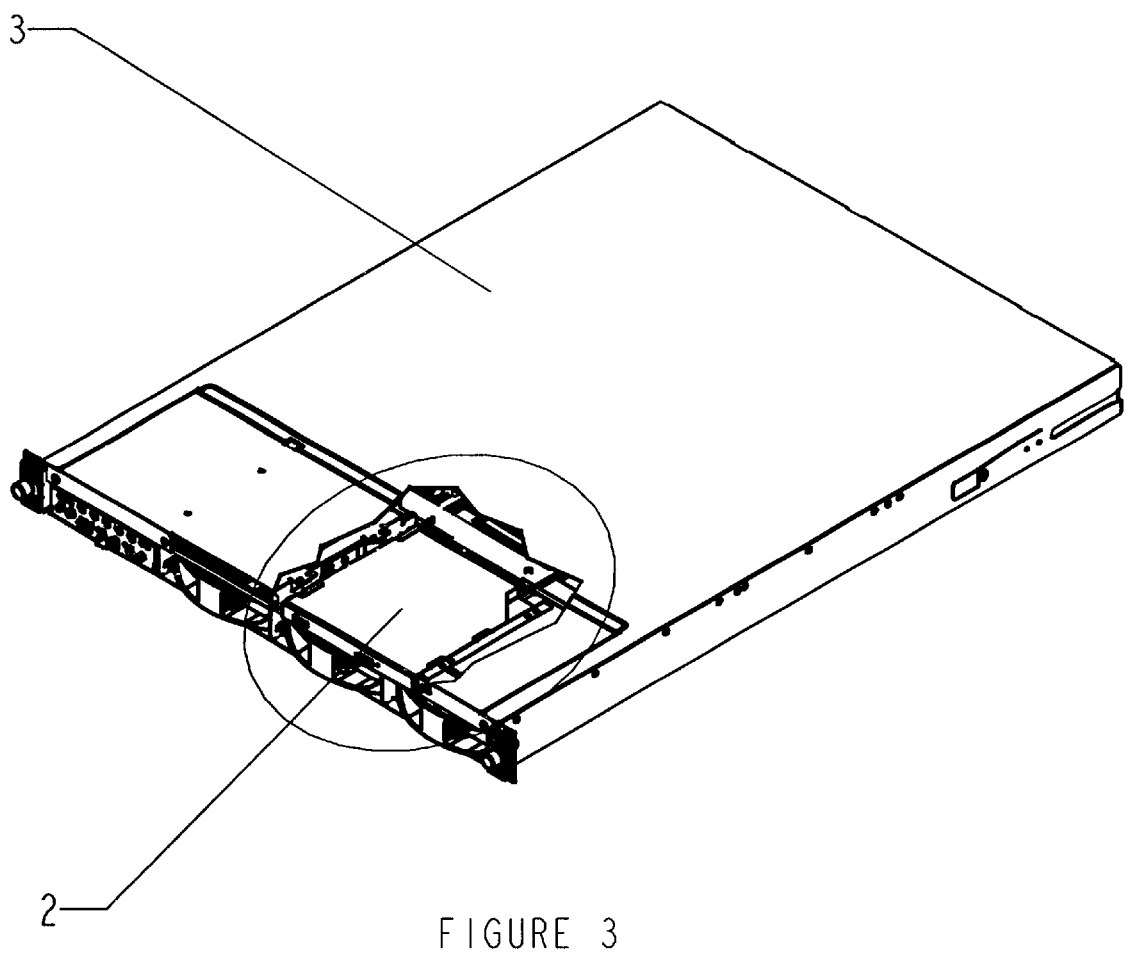
FIG. 3 shows a component tray with multiple drives mounted in the drive compartments.
Figure 4:
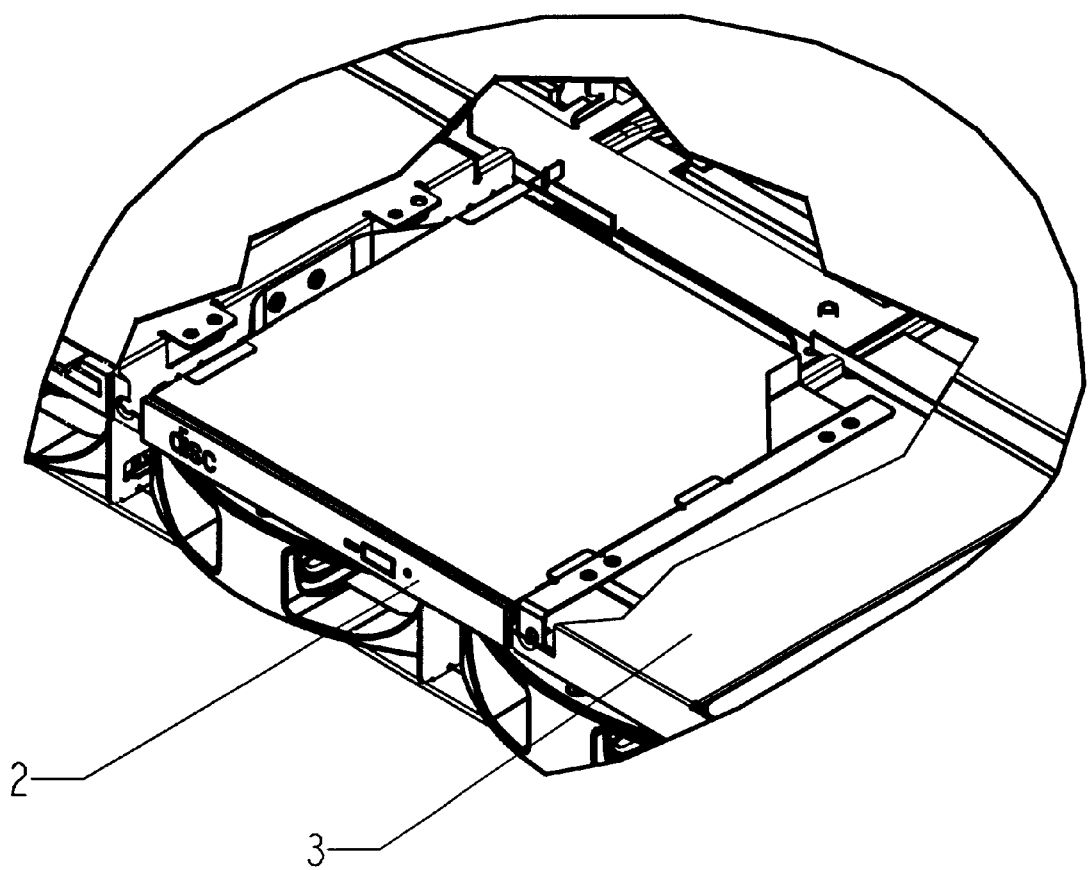
FIG. 4 is a detail view of the area circled in FIG. 3.

The present invention is a spring loaded drive clip 1. The drive clip 1 is used to mount a drive unit 2, typically a CD drive, in a component tray 3 that is utilized in a rack mounting arrangement for a computer system.

The drive clip 1 comprises a mounting base 10 with two clip arms 11 extending outward from the base 10. Each arm 11 includes a spring blade 111 and a drive receiving bracket 112. The drive receiving bracket 112 includes a vertical side wall 1121 and a pair of overhanging retaining ridges 1122. The side wall 1121 and the retaining ridges 1122 form a slot that receives the drive unit 2.

The rear clip arm 11 includes on its side wall 1121 a securing projection 113. The securing projection 113 extends inward from the side wall 1121 at a position corresponding to a standard tapped mounting hole 21 in the drive case 22. In the preferred embodiment, the securing projection 113 is formed simply by punching a tab out of the side wall 1121. While the preferred embodiment uses a single securing projection 113, it should be clear to one skilled in the art that more than one securing projection 113 could be utilized.

Using the drive clip 1 of the present invention, assembly of a drive unit 2 into a component tray 3 is quite straightforward. The drive clip 1 is mounted onto the chassis of the component tray 3. The arms 11 of the clip 1 extend inward into the compartment that receives the drive unit 2. As the assembler inserts the drive unit 2 into the compartment of the component tray 3, the arms 11 of the clip 1 are pressed outward by the drive unit 2. As the drive unit reaches its proper position, the biasing force of the spring blades 111 in the arms 11 urges the securing projection 113 into the tapped mounting hole 21 in the drive unit 2. The tapped mounting hole 21 is in a standard position on the drive 2, so that the securing projection 113 will always accurately mate with the mounting hole 21. The assembly process is thus reduced to simply inserting the drive unit 2 into the compartment of the component tray 3.

The above disclosure is not intended as limiting. Those skilled in the art will readily observe that numerous modifications and alterations of the device may be made while retaining the teachings of the invention. Accordingly, the above disclosure should be construed as limited only by the restrictions of the appended claims.

We claim:

1. A drive clip in combination with a component tray and a drive unit comprising:

a mounting base affixed to a chassis of said component tray, and two clip arms extending outward from said base; wherein each said clip arm includes a biasing means and a drive receiving means, and said drive clip further includes at least one securing projection extending inward from said drive clip, said securing projection is located at a position corresponding to a mounting hole in a case of said drive unit; such that when said drive unit is inserted into a compartment of said component tray, said arms of said drive clip are pressed outward by said drive unit, and as said drive unit reaches a proper position, a biasing force of said biasing means urges said securing projection into said mounting hole in said drive unit, thereby securing said drive unit in position without requiring any mounting assembly to be affixed to said drive unit.

2. The drive clip of claim 1 wherein:
said drive receiving means comprises a vertical side wall and a pair of overhanging retaining ridges.

3. The drive clip of claim 1 wherein:
said securing projection extends inward from a vertical side wall of said drive receiving means, said securing projection comprising a tab punched out of said side wall.

* * * * *